United States Patent
Töpfer et al.

(10) Patent No.: US 11,594,841 B2
(45) Date of Patent: Feb. 28, 2023

(54) LOCKING DEVICE FOR AN ELECTRICAL CHARGING DEVICE

(71) Applicant: Kiekert AG, Heiligenhaus (DE)

(72) Inventors: Claus Töpfer, Sindelfingen (DE); Winfried Schlabs, Bochum (DE); Benjamin Djedovic, Oberhausen (DE); Fatih Özdogan, Wuppertal (DE)

(73) Assignee: Kiekert AG, Heiligenhaus (DE)

( * ) Notice: Subject to any disclaimer, the term of this patent is extended or adjusted under 35 U.S.C. 154(b) by 211 days.

(21) Appl. No.: 16/956,646

(22) PCT Filed: Nov. 21, 2018

(86) PCT No.: PCT/DE2018/100951
§ 371 (c)(1),
(2) Date: Oct. 27, 2020

(87) PCT Pub. No.: WO2019/120371
PCT Pub. Date: Jun. 27, 2019

(65) Prior Publication Data
US 2021/0075160 A1 Mar. 11, 2021

(30) Foreign Application Priority Data
Dec. 20, 2017 (DE) ...................... 10 2017 130 658.7

(51) Int. Cl.
*H01R 13/639* (2006.01)
*B60L 53/16* (2019.01)

(52) U.S. Cl.
CPC ............ *H01R 13/639* (2013.01); *B60L 53/16* (2019.02); *H01R 2201/26* (2013.01)

(58) Field of Classification Search
CPC .............. H01R 13/639; H01R 2201/26; H01R 13/6278; B60L 53/16
(Continued)

(56) References Cited

U.S. PATENT DOCUMENTS 8,262,402 B2 * 9/2012 Gaul ...................... B60L 53/66
439/304
8,951,060 B2 * 2/2015 Meyer-Ebeling ....... B60L 53/16
320/109
(Continued)

FOREIGN PATENT DOCUMENTS

CN 202695855 U 1/2013
DE 102011050998 A1 6/2012
(Continued)

OTHER PUBLICATIONS

Translated Description. JP 2013187094 A .Nissan Motor. (Year: 2013).*
(Continued)

*Primary Examiner* — William A Bolton
(74) *Attorney, Agent, or Firm* — Renner, Otto, Boisselle & Sklar, LLP

(57) ABSTRACT

A locking device for an electrical charging device of a motor vehicle, in particular an electric or hybrid vehicle. The locking device is equipped with a movable bolt element, which is provided for releasably locking a charging plug in a charging socket of the electrical charging device. In addition, the movable bolt element can be moved at least into the positions "unlocked" and "locked." Furthermore, a motor-driven drive is realized, which is provided for moving the bolt element. According to the invention, the bolt element can be moved into a third "self-locked" position beyond the "locked" position, which can be reached by means of the drive and in which unlocking is impossible without the drive.

18 Claims, 4 Drawing Sheets

(58) Field of Classification Search
USPC .......................................................... 439/304
See application file for complete search history.

(56) References Cited

U.S. PATENT DOCUMENTS

| | | | | |
|---|---|---|---|---|
| 9,193,270 | B2* | 11/2015 | Tanneberger | B60L 53/00 |
| 9,401,566 | B2* | 7/2016 | Boeck | H01R 13/52 |
| 9,647,389 | B2* | 5/2017 | Moseke | H01R 13/6397 |
| 9,751,414 | B2* | 9/2017 | Erices | B60L 3/0069 |
| 9,828,792 | B2* | 11/2017 | Bendel | E05B 81/06 |
| 9,944,172 | B2* | 4/2018 | Basavarajappa | B60L 53/68 |
| 10,328,809 | B2* | 6/2019 | Masuda | B60L 53/30 |
| 2012/0238122 | A1 | 9/2012 | Hirashita | |
| 2017/0057346 | A1* | 3/2017 | Herzig | B60K 15/05 |
| 2021/0237687 | A1* | 8/2021 | Tsuchiya | H04W 12/06 |

FOREIGN PATENT DOCUMENTS

| | | |
|---|---|---|
| DE | 102011050536 A1 | 11/2012 |
| DE | 102012022413 B3 | 2/2014 |
| DE | 202013009554 U1 | 1/2015 |
| DE | 102013110428 A1 | 3/2015 |
| DE | 102014217696 A1 | 3/2016 |
| DE | 102015224949 A1 | 6/2017 |
| JP | 2013187094 A | 9/2013 |
| WO | 2010149426 A1 | 12/2010 |

OTHER PUBLICATIONS

Translation of International Search Report dated Feb. 12, 2019 for PCT/DE2018/100951.
First Office Action dated Oct. 26, 2021, for co-pending Chinese Patent Application No. 201880089569.6.

* cited by examiner

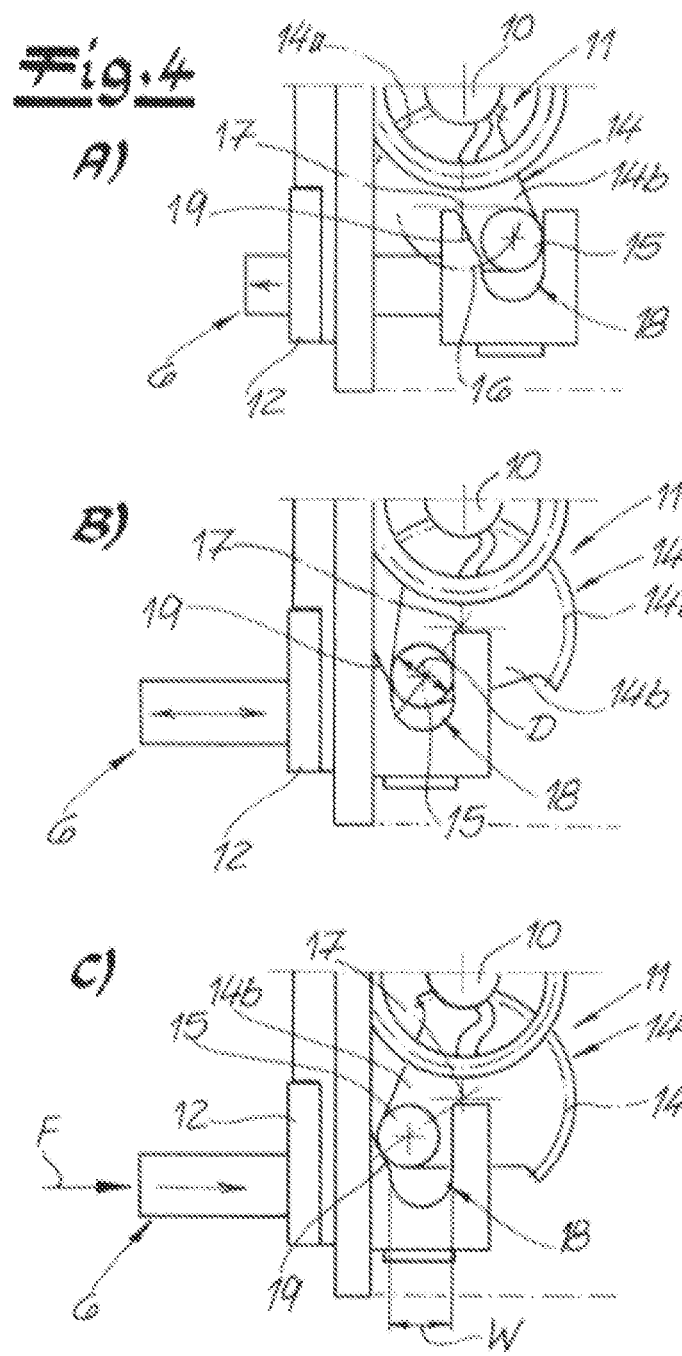

LOCKING DEVICE FOR AN ELECTRICAL CHARGING DEVICE

FIELD OF INVENTION

The invention relates to a locking device for an electrical charging device of a motor vehicle, in particular of an electric or hybrid motor vehicle, comprising a moveable bolt element, which is provided for releasably locking a charging plug in a charging socket of the electrical charging device and can be shifted at least into the "unlocked" and "locked" positions, and comprising a motor-driven drive, which is provided for shifting the bolt element.

BACKGROUND OF INVENTION

Accumulators of electric or hybrid motor vehicles regularly have to be supplied with electrical power. This is done by drawing on charging infrastructure to which charging stations typically belong. In order to charge the accumulators with electrical power, the charging plug is generally coupled and releasably locked to a motor vehicle-side charging socket. The locking process is required to prevent health risks, since a high voltage is generally being used at this point.

Furthermore, the locking action ensures that a previously identified user also lawfully obtains the electrical power provided by the charging station and prevents misuse, for example. In known solutions, as described in WO 2010/149426 A1 in this connection, communication takes place by means of an identification signal in order to verify the authorization of the user and to ensure that the user also pays for the electrical power taken.

Various solutions are described in the prior art for the bolt element drive. Therefore, DE 10 2014 217 696 A1 discloses providing a pressure spring for the bolt element for this purpose, by means of which the bolt element is prestressed.

In the generic prior art according to CN 2020695855 U, an electric motor-driven drive is provided for the bolt element drive. The electric motor-driven drive is made up of an electric motor and a downstream multistage transmission. The multistage transmission operates on the bolt element by means of a cam.

In this way, at the very least and very basically, the two positions "unlocked" and "locked" of the bolt element can be formed and preset. The cam is, in turn, carried by a gearwheel. In addition, the processes of adjusting the cam and therefore of reaching the different positions are queried by means of sensors or switches. However, any manipulation of the bolt element cannot dominate in the end since, in the "locked" position, for example, forces acting on the locking element can easily shift the cam and the transmission, and therefore as a whole the "locked" position can be relatively easily deselected in the event of manipulation. This is where the invention starts from.

SUMMARY OF INVENTION

The technical problem addressed by the invention is to develop such a locking device for an electrical charging device of a motor vehicle, and in particular of an electric or hybrid motor vehicle, such that overall safety is increased and in particular the "locked" position that the bolt element reaches cannot be deselected by external manipulation.

In order to solve this technical problem, for a generic locking device for an electrical charging device, the invention proposes that the bolt element can be shifted into a third "self-locked" position that is beyond the "locked" position, wherein the third "self-locked" position can be moved into by means of the drive, and in which unlocking without the drive is not possible.

Therefore, the invention firstly does not only draw on the two known positions, "unlocked" and "locked" of the locking element, but the bolt element or the motor-driven drive can be moved into a third "self-locked" position. This third "self-locked" position is provided beyond the "locked" position, i.e. is then moved into by the motor-driven drive if it has already passed the "locked" position. This is an "overtravel position."

In this case, the third "self-locked" position is ultimately expressive of the fact that the bolt element is locked by means of the motor-driven drive. This means that, in the third "self-locked" position, the motor-driven drive on the one hand and the bolt element on the other hand are moved towards one another and abut one another such that action on the bolt element in this "self-locked" position does not cause the bolt element, and with it the motor-driven drive, to be transferrable into the "unlocked" position. Unlocking without the drive, that is, without a motor-driven adjustment to the drive, is not possible.

Instead, manual action on the bolt element in the third "self-locked" position leads to no torque being transmittable to the motor-driven drive by means of the bolt element, for example; as a result, the bolt element cannot be acted upon in the "unlocking" direction. Such self-locking is not achieved in the generic prior art for the reasons already illustrated above in accordance with CN 2020695855 U and cannot be set, either. As a result, overall safety is considerably increased and manipulation can be prevented. This is where the essential advantages can be seen.

According to an advantageous embodiment, in the "self-locked" position of the bolt element in general, a force acting thereon is deflected with respect to the drive in the unlocking direction in a torque-free manner. This means that, provided that the bolt element is acted upon in the "self-locked" position by a manipulative force in the unlocking direction, this force acts on the drive in a torque-free manner such that the drive as a whole is not acted upon and the bolt element consequently maintains its "self-locked" position. Only after the drive is also supplied with power and thus shifted can the "self-locked" position be deselected.

In order to bring about and implement this in detail, the bolt element generally comprises a fork mount for a pin of the drive that engages therein. In this case, the end of the pin is generally connected to a transmission between an electric motor and the bolt element. By means of the pin of the drive engaging in the fork mount on the bolt element, the bolt element can be transferred into the above-described three positions.

In this case, an inside width of the fork mount and the diameter of the pin are also adapted to one another. The inside width of the fork mount is usually slightly greater than the diameter of the pin. In addition, the fork mount advantageously still has a starting slope for the pin of the drive that abuts said starting slope in the "self-locked" position. In fact, it is designed such that the pin of the drive travels against said starting slope in the "self-locked" position. If, in this position, a (manual) force is exerted on the bolt element in the "unlocking" direction, due to the starting slope formed, the applied force vector runs such that a torque does not act on the drive and the bolt element is consequently not unlocked.

In fact, the pin is generally formed as a component of a crank mechanism. In the above-described manipulation process in the unlocking direction, when the pin abuts the starting slope in the "self-locked" position, the force vector runs in this case in the direction in which it is directed towards the axis of rotation of the crank mechanism or passes through the axis of rotation of the crank mechanism. As a result, by means of this force vector, a torque cannot be exerted on the crank mechanism and consequently not on the drive as a whole, either. The bolt element consequently maintains its "self-locked" position in the event of such manipulation attempts. Unlocking without the drive, i.e. without the drive being shifted by the motor, is not possible.

The fork mount is generally provided at the head of the bolt element. In addition, the fork mount is U-shaped when viewed from the side. The starting slope is usually arranged on the opening side, i.e. along an opening of the U-shaped fork mount.

As already mentioned, the pin is formed as a component of a crank mechanism. The crank mechanism in turn constitutes a component of the transmission addressed above and therefore of the drive. This means that the motor-driven drive is substantially composed of the electric motor and the downstream transmission, including the crank mechanism. In principle, an intermediary transmission can also be dispensed with.

The pin is generally provided at one end of a crank web. The crank web is in turn usually circular segment-like. An engagement region is provided at the circumference of this circular segment or circular segment-like crank web. The engagement region interacts with a corresponding engagement region of a gear of the transmission. In this way, the crank web can be pivoted back and forth, in order to correspondingly linearly displace the bolt element back and forth by means of the connected pin and as a result of engaging in the fork mount of the bolt element.

In fact, the pin is connected to one end of the crank web, specifically opposite the engagement region. This means that the pin is usually near the center of the circular segment-like crank web. As a result, the crank web can carry out a circular arc-shaped movement together with the pin, which is transmitted to the bolt element by means of the fork mount as a whole.

As a result, a locking device is provided for an electrical charging device of a motor vehicle, which knows another functional position, "self-locked," in addition to the well-known positions, "unlocked" and "locked," of the bolt element. In this "self-locked" functional position, the bolt element is ultimately blocked by means of the motor-driven drive. The bolt element cannot be unblocked, even in the event of (manual) manipulation of the bolt element and an unlocking attempt, since the force acting on the bolt element is deflected with respect to the motor-driven drive in the unlocking direction in a torque-free manner. This is where the essential advantages can be seen.

BRIEF DESCRIPTION OF DRAWINGS

The invention will be described in more detail in the following on the basis of a set of drawings, which show just one exemplary embodiment, in which:

FIG. 4A to 4C show the locking device according to the invention, including the bolt element, specifically in different functional positions, specifically "unlocked" (FIG. 4A), "locked" (FIG. 4B) and "self-locked" (FIG. 4C).

DETAILED DESCRIPTION

First of all, the drawings show an electrical connecting device, in particular for electric or hybrid motor vehicles. Furthermore, the locking device according to the invention for an electrical charging device of such a motor vehicle, i.e. of an electric or hybrid motor vehicle, can be seen in the figures. In the perspective overview according to FIG. 2, only a vehicle body 1 of said electric or hybrid motor vehicle can be seen to some extent. The vehicle body 1 is equipped with a recess 2.

A charging socket 3 is arranged in the recess 2 as a component of the electrical charging device. The locking device according to the invention for such an electrical charging device belongs to said charging socket. The charging socket 3 can be electrically coupled to a charging plug 4 so as to be releasably locked thereto, for which purpose the charging plug 4 is introduced into the recess 2 in the vehicle body 1 and coupled to the charging socket 3 so as to form an electrical connection therewith. The charging plug 4 generally does not belong to the electrical charging device provided on the vehicle body, but usually constitutes a component of a charging station or the charging infrastructure in general.

Figure 2:
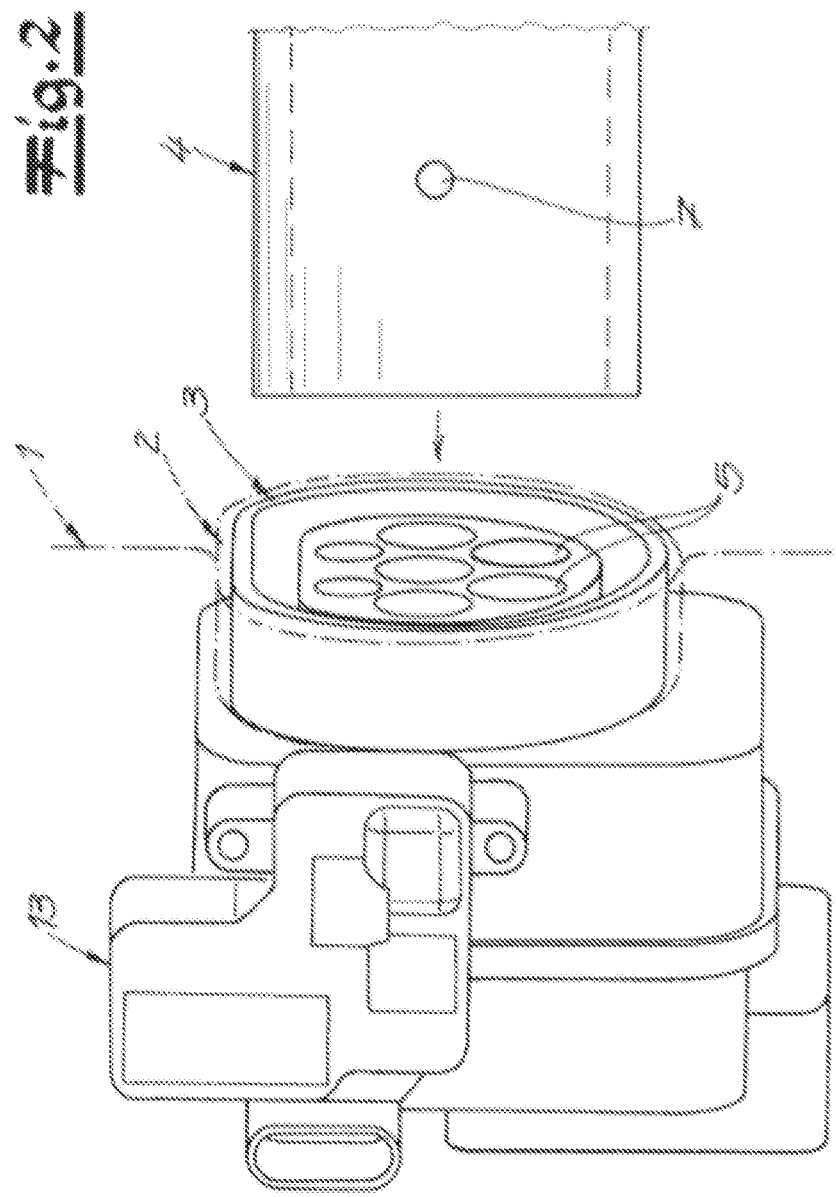
FIG. 2 is a perspective view of the subject matter according to FIG. 1 with the associated motor vehicle.

In order to electrically connect the charging plug 4 to the charging socket 3, the charging plug 4 comprises plug contacts, which are not clearly visible in FIG. 2 and which engage in the associated female connectors 5 inside the charging socket 3. Of course, this can also be reversed. In this case, the charging socket 3 is equipped with the plug contacts, which releasably engage in the associated female connectors 5 of the charging plug 4 (however, not shown).

In order to releasably lock the charging plug 4 to the charging socket 3, a moveable bolt element 6 is provided. In the exemplary embodiment, the moveable bolt element is a locking pin or locking push rod, thus an altogether cylindrical bolt element 6, which is formed as a metal pin or plastics component. The bolt element 6 engages in an associated recess 7, which is visible in FIG. 2, in the charging plug 4, specifically at the head, in order to releasably lock the charging plug 4 with respect to the charging socket 3. Furthermore, the bolt element 6 can also engage in an additional recess in the charging socket 3 when in the locked state, which is, however, not shown in detail.

The bolt element 6 can be moved with respect to the recess 7 in the charging plug 4 in order to establish or release the locking action between the charging plug 4 and the charging socket 3. In this case, the unlocked state of the bolt element 6 is shown in FIG. 4A. FIG. 4B shows the "locked" state of the bolt element 6. Movements of the bolt element 6 in its longitudinal direction correspond to this in each case, as indicated by a double-headed arrow in FIG. 1. According to the exemplary embodiment, an electric motor-driven drive 8, 9, 10, 11; 14, 15 provides for the adjustment movements of the bolt element 6.

Figure 1:
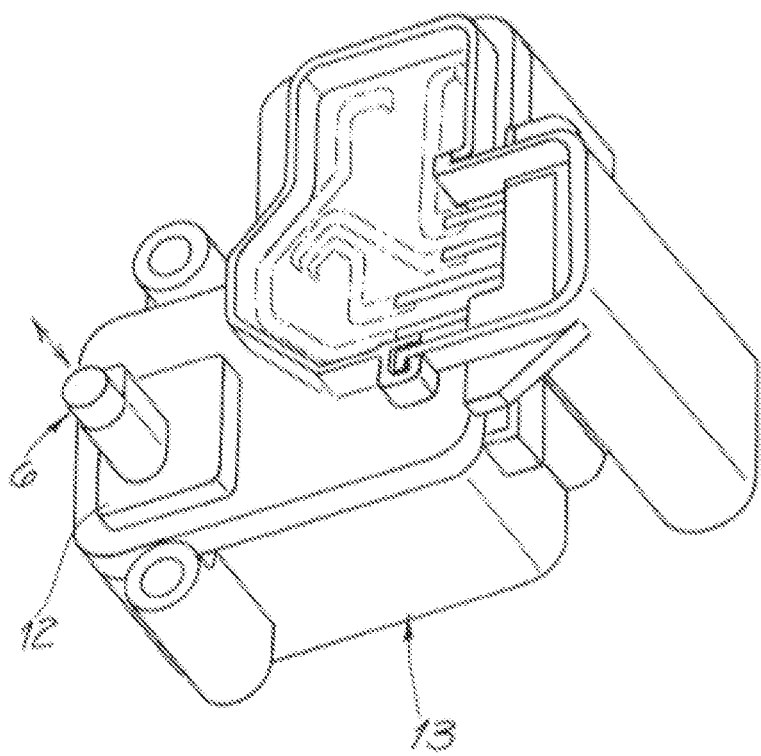
FIG. 1 is an overview of a connecting device.

The electric motor-driven drive 8 to 11; 14, 15 is accommodated in its own drive housing 13 and surrounded by the drive housing 13 as a whole, as illustrated in FIG. 1. In this way, the drive 8 to 11; 14, 15 can be modular and placed and installed in a suitable position inside the vehicle body 1 independently of the charging socket 3. In this connection, a seal 12 provided on the outside of the drive housing 13 ensures that the bolt element 6 can be moved back and forth while being sealed with respect to the drive housing 13. For this purpose, the seal 12 is provided in the region of the bolt element 6 and surrounds it. Furthermore, since the bolt element 6 is mounted in the drive housing 13, altogether an assembly that is ready for installation or an installation module is provided, which, according to the view in FIG. 2, can be coupled to the charging socket 3. In principle, the invention also includes solutions in which the drive 8 to 11; 14, 15 and the charging socket 3 are accommodated in a common housing, which is, however, not shown.

Figure 3:
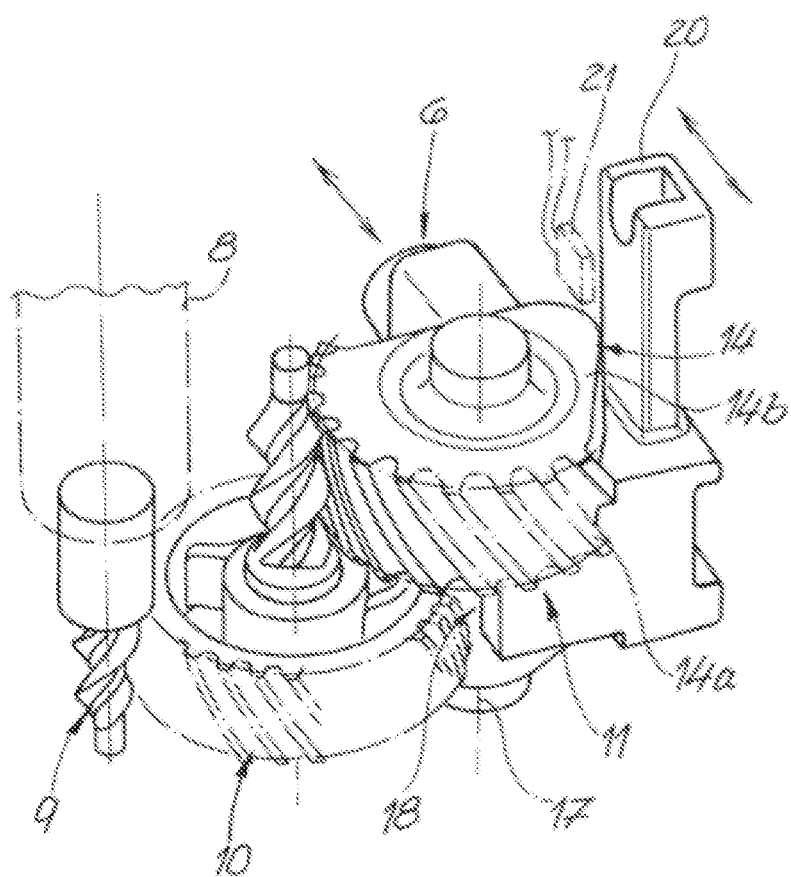
FIG. 3 is a perspective view of the motor-driven drive.

In detail, the drive 8 to 11; 14, 15 is made up of an electric motor 8 and an associated transmission 9 to 11, as is best visible in FIG. 3. In addition, a crank mechanism 14, 15 is formed. The transmission 9 to 11 is equipped with a total of three transmission stages 9 to 11 having associated transmission shafts. In fact, the drive 8 firstly drives a first transmission shaft 9 by means of its output-side output shaft, which transmission shaft in turn meshes with an additional second transmission shaft 10. The transmission shaft 9 and the additional second transmission shaft 10 are arranged so as to laterally largely overlap. Furthermore, another third transmission shaft 11 is positioned so as to laterally overlap the second transmission shaft 10 and the electric motor 8 inside the drive housing 13 (cf. FIG. 3).

It can be seen that the individual transmission stages or the transmission shafts 9, 10, 11 are arranged in parallel with one another. In addition, said transmission stages 9, 10, 11 or transmission shafts 9, 10, 11 and associated gears are, as a whole, made of plastics material, but are not limited thereto. The teeth that engage in one another are evoloid teeth and helical teeth or spur gear teeth, these of course only being examples and not being limiting.

The third transmission stage or the transmission shaft 11 is equipped with a crank web 14 as a component of the crank mechanism 14, 15, which web can be seen in particular in the lateral views according to FIG. 4A to 4C. The crank web 14 is circular segment-like and equipped with a circumferential engagement region 14a and a pin 15, which is arranged in or near to a center 14b. The circumferential engagement region 14a meshes with an extension of the second transmission stage 10 having circumferential teeth and can thereby define a pivot movement of the pin 15, which is indicted in FIG. 4A by a circular arc 16.

This means that, depending on the actuation of the electric motor 8, the transmission 9 to 11 ensures that the crank web 14, and with it the pin 15 arranged thereon, is pivoted. In fact, the electric motor 8 is actuated here such that the pin 15 can be moved back and forth along the circular arc 16 defined in this way. In this case, the crank web 14 is pivoted about its axis 17, as indicated.

As a whole, the pin 15 engages in a fork mount 18. The fork mount 18 is U-shaped and is arranged at the head of the bolt element 6. By comparing FIG. 4A to 4C, it is clear that the fork mount 18 is not only U-shaped when viewed from the side, but also has a starting slope 19 on the opening side. This means that the starting slope 19 is provided and arranged in the region of an opening of the U-shaped fork mount 18. In this case, the starting slope 19 is oriented as a whole such that it leads to an enlargement of an inside width W of the fork mount 18 towards the opening of the U-shaped fork mount 18. As a whole, the inside width W of the fork mount 18 is adapted to a diameter D of the pin 15 received therein such that, as a whole, said pin 15 is accommodated in the U-shaped fork mount 18 with a small amount of play.

The locking device functions as follows. By comparing FIG. 4A to 4C, it is clear that the bolt element 6 can be moved not only into the "unlocked" position according to the view in FIG. 4A and the "locked" position according to FIG. 4B, but, according to the invention, a third "self-locked" position can also be moved into by means of the motor-driven drive 8 to 11, 14, 15, as is shown in FIG. 4C. In this case, the "self-locked" position is located beyond the "locked" position per the view in FIG. 4B.

In fact, when transitioning from the "locked" position according to FIG. 4B to the "self-locked" position according to FIG. 4C, the motor-driven drive 8 to 11; 14, 15 is moved into a type of "overtravel position." In this overtravel position or in the "self-locked" position, unlocking without the motor-driven drive 8 to 11; 14, 15 is not possible. This means that the motor-driven drive 8 to 11; 14, 15 has to be supplied with power in order to deselect the "self-locked" position. This is because, in the "self-locked" position according to FIG. 4C, the bolt element 6 is ultimately blocked by means of the motor-driven drive 8 to 11; 14, 15 and even the application of a force to the bolt element 6, by means of a manipulation for example, does not cause the bolt element 6 to be transferred to its "unlocked" position.

If, for example, the bolt element 6 in the "self-locked" position according to FIG. 4C is manually acted upon by a force F shown in said figure, this force F is deflected together with its force vector that is oriented in the longitudinal direction of the cylindrical bolt element 6. This means that, in the "self-locked" position of the bolt element 6, the force F acting thereon is deflected with regard to the drive 8 to 11; 14, 15 in the unlocking direction in a torque-free manner. The starting slope 19 substantially ensures this.

In fact, by means of the force arrows in FIG. 4C into the "self-locked" position, it can be seen that said force F or the force vector thereof runs perpendicularly to the starting slope 19 and thus the resultant and deflected force is directed towards the axis 17 of the crank web 14. Since the deflected force F consequently acts on the axis 17 and not at a spacing therefrom, no torque can be transmitted to the crank web 14 either. As a result, such manipulations do not lead to the bolt element 6 being transferred to the "unlocked" position, either. Instead, the bolt element 6 remains in its "self-locked" position per FIG. 4C.

Only after the motor-driven drive 8 to 11; 14, 15 is supplied with power and ensures that the crank web 14 pivots in the "unlocking" direction is the bolt element 6 unblocked in the "self-locked" position. Subsequently, the bolt element 6 can then be transferred to the "unlocked" position per the view in FIG. 4A.

As already mentioned, the pin 15 is connected to one end of the crank web 14, which in turn can be pivoted about the axis 17 such that the pin 15 carries out movements along the circular arc 16. These movements of the pin 15 along the circular arc 16 correspond to the bolt element 6 being movable back and forth along the double-headed arrow in FIG. 1. As a result, a cantilever 20 that can be seen in FIG. 3 and is connected to the bolt element 6 is also moved back and forth, as additionally shown by a double-headed arrow in FIG. 3. This back and forth movement of the cantilever 20 can be queried by means of a stationary sensor 21 indicated in FIG. 3. As a result, the individual functional positions "unlocked" and "locked" and optionally "self-locked" can be recorded by means of a sensor using the sensor 21.

The invention claimed is:

1. A locking device for an electrical charging device of a motor vehicle, the locking device comprising:
    a moveable bolt element, which is provided for releasably locking a charging plug in a charging socket of the electrical charging device and which can be shifted into an unlocked position and locked position, and a motor-driven drive, which is provided for shifting the moveable bolt element via a pin of the motor-driven drive, wherein the moveable bolt element is shifted into a self-locked position that is beyond the locked position, wherein the motor-driven drive is configured to move the moveable bolt element into the self-locked position in which the pin prevents the moveable bolt element from shifting to the unlocked position without activation of the motor-driven drive, wherein, in the self-locked position of the moveable bolt element, a force acting thereon is deflected with respect to the motor-driven drive in an unlocking direction in a torque-free manner, and wherein the moveable bolt element includes a fork mount in which the pin of the motor-driven drive engages.

2. The locking device according to claim 1, wherein an inside width of the fork mount and a diameter of the pin are adapted to one another.

3. The locking device according to claim 1, wherein the fork mount has a starting slope for the pin of the motor-driven drive that abuts said starting slope when the moveable bolt element is in the self-locked position.

4. The locking device according to claim 3, wherein the fork mount is U-shaped when viewed from a side comprising the starting slope.

5. The locking device according to claim 1, wherein the pin is formed as a component of a crank mechanism.

6. The locking device according to claim 5, wherein the motor-driven drive comprises an electric motor and the crank mechanism.

7. The locking device according to claim 6, wherein the motor-driven drive includes a downstream transmission relative to the electric motor.

8. The locking device according to claim 7, wherein the downstream transmission includes a plurality of stages that have shafts which are parallel to each other.

9. The locking device according to claim 8, wherein one of the plurality of stages includes a crank web.

10. The locking device according to claim 5, wherein the pin is connected to one end of a crank web of the crank mechanism that is opposite an engagement region.

11. The locking device according to claim 10, wherein the crank web is circular segment with the engagement region at a circumference of the crank web and the pin near to a center of the crank web.

12. The locking device according to claim 11, wherein a pivot movement of the pin is defined by a circular arc.

13. The locking device according to claim 5, wherein the fork mount has a starting slope for the pin of the motor-driven drive, wherein the force that acts on the moveable bolt element occurs perpendicularly relative to the starting slope whereby the force is deflected toward an axis of the crank mechanism to maintain the moveable bolt element in the self-locked position.

14. The locking device according to claim 13, wherein the motor-driven drive is powered to pivot the crank mechanism in the unlocking direction to unblock the moveable bolt element in the self-locked position whereby the moveable bolt element is moveable to the unlocked position.

15. The locking device according to claim 1, wherein the moveable bolt element is engageable in a recess of the charging plug.

16. The locking device according to claim 1, wherein the moveable bolt is moveable between the locked position and the unlocked position along a longitudinal axis of the moveable bolt.

17. The locking device according to claim 1 further comprising a drive housing that houses the motor-driven drive and is arranged in a vehicle body independently relative to the charging socket.

18. The locking device according to claim 17 further comprising a seal that is arranged on an outside of the drive housing and in a region of the moveable bolt element to surround the moveable bolt element.

* * * * *